United States Patent

Pak et al.

[11] Patent Number: 5,916,839
[45] Date of Patent: *Jun. 29, 1999

[54] CATALYST FOR PURIFYING AUTOMOBILE EXHAUSTS

[75] Inventors: Chan-ho Pak; Sang-cheol Park, both of Seoul, Rep. of Korea

[73] Assignee: Samsung Electro-Mechanics Co., Ltd., Kyungki-Do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/729,335

[22] Filed: Oct. 15, 1996

[30] Foreign Application Priority Data

Oct. 13, 1995 [KR] Rep. of Korea ............ 95-35368

[51] Int. Cl.$^6$ .............. B01J 21/12; B01J 23/58
[52] U.S. Cl. .......... 502/328; 502/261; 502/263; 502/304; 502/328
[58] Field of Search ............ 502/304, 328, 502/332, 333, 334, 339, 340, 341, 261, 263

[56] References Cited

U.S. PATENT DOCUMENTS

| | | | |
|---|---|---|---|
| 3,388,077 | 6/1968 | Hoekstra | 252/466 |
| 4,171,288 | 10/1979 | Keith et al. | 252/462 |
| 4,438,219 | 3/1984 | Brandenburg et al. | 502/333 |
| 4,906,443 | 3/1990 | Gandhi et al. | 423/213.7 |
| 5,260,249 | 11/1993 | Shiraishi et al. | 502/304 |
| 5,489,522 | 2/1996 | Subramanian et al. | 423/213.5 |

OTHER PUBLICATIONS

CATSJ Meeting Abstract, vol. 37, No. D3, 1995, pp. 98–101, no month.

Primary Examiner—Michael Lewis
Assistant Examiner—Alexander G. Ghyka
Attorney, Agent, or Firm—Foley & Lardner

[57] ABSTRACT

A catalyst useful in purifying exhaust gases is disclosed which includes: (a) a carrier including a composite of $SiO_2$, γ-alumina and an alkali earth metal oxide selected from the group consisting of MgO and BaO; (b) an oxygen absorbing material; and (c) at least one noble metal.

19 Claims, 2 Drawing Sheets

CATALYST FOR PURIFYING AUTOMOBILE EXHAUSTS

BACKGROUND OF THE INVENTION

1. Field of the Invention

The present invention relates to a catalyst which is capable of purifying exhaust gases, such as those produced by motorized vehicles, and in particular, automobiles. More particularly, the present invention relates to a catalyst capable of purifying the exhaust gases of a motorized vehicle which maintains heat resistance and thus good purification efficiency for undesirable and/or harmful gases at high levels over an extended period time.

2. Background of Related Art

As the number of automobiles increases, pollution due to exhaust gases is becoming more and more serious. The chief harmful components of automobile exhaust gases include hydrocarbons, carbon monoxide, and nitrogen oxides (NOx), and the release of these pollutants is more profound in exhaust produced by diesel engines.

At present, the most typical catalyst for purifying the exhaust gases of an automobile is a 3-way catalyst capable of removing carbon monoxide, hydrocarbons and nitrogen oxides at the same time. A typical 3-way catalyst is generally formed by coating a carrier on a honeycomb structure. The carrier is typically impregnated with a noble metal such as platinum (Pt) or rhodium (Rh) and an oxygen absorbing material.

Meanwhile, it is generally beneficial for the carrier employed to have a large surface area in order to increase the contact area between the active metal, which is impregnated in the carrier, and the exhaust gases. γ-alumina is known to satisfy such requirement. That is, a 3-way catalyst employing γ-alumina as a carrier shows a considerably high purification efficiency for harmful 3-way gases, i.e., hydrocarbons, carbon monoxide, and nitrogen oxides (NOx), at ideal conditions in which the air-to-fuel ratio in an engine is 14.7:1.

However, when heated above 1000° C., γ-alumina changes into α-alumina which has a small specific surface area. Thus, at temperatures above about 1000° C., the reactivity of the catalyst is lowered. Thus, when used for a long time at high temperatures, the activity of the 3-way catalyst rapidly deteriorates, and thus substantial quantities of harmful or undesirable gases are released into the atmosphere.

SUMMARY OF THE INVENTION

An object of the present invention is to provide an effective catalyst for purifying exhaust gases, such as those produced by motorized vehicles, and in particular, automobiles, which has superior heat resistance and can last over an extended time period.

To achieve these and other objects, there is provided a catalyst capable of purifying exhaust gases comprising: a carrier comprising a composite of $SiO_2$, γ-alumina and an alkali earth metal oxide selected from the group consisting of MgO and BaO, an oxygen absorbing material, and at least one noble metal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention. The above object and advantages of the present invention will become more apparent by describing in detail a preferred embodiment thereof with reference to the attached drawings in which.

DETAILED DESCRIPTION OF THE PREFERRED EMBODIMENTS

Figure 1A:
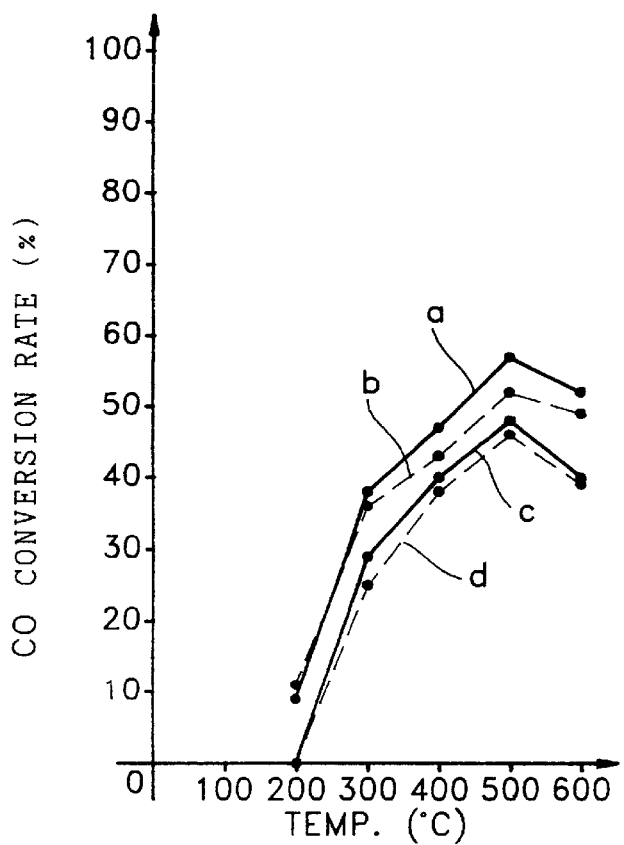
FIGS. 1A, 1B and 1C are graphs showing conversion rates at varying temperatures for carbon monoxide, propylene and nitrogen monoxide, respectively, and show a comparison between the conversion rates which are obtained using a conventional catalyst and a catalyst according to the present invention.

The present invention is directed toward a catalyst for purifying exhaust gases of motorized vehicles, in particular automobiles, comprising a carrier, an oxygen absorbing material, and noble metal, wherein the carrier is a composite of $SiO_2$, γ-alumina and an alkali earth metal oxide selected from the group consisting of MgO and BaO.

Preferably, the alkali earth metal oxide, $SiO_2$ and γ-$Al_2O_3$ have the following conditions: 2 to 15% by weight of MgO or BaO, 2 to 10% by weight of $SiO_2$ and 75–96% by weight of γ-$Al_2O_3$, each % being based upon the total weight of the composite.

The present invention relates to a catalyst for purifying exhaust gases of exhaust gases such as those produced by motorized vehicles, and in particular by automobiles, comprising a carrier, an oxygen absorbing material, and a noble metal. In accordance with the present invention, it has been found that a carrier comprising $SiO_2$, γ-alumina and an alkali earth metal oxide selected from the group consisting of MgO and BaO is less likely to undergo a phase change from γ-alumina to α-alumina at high temperatures. A carrier according to the present invention is also less likely to experience a reduction in the ratio of specific surface area at high temperatures. Therefore, a catalyst according to the present invention is effective for purifying automobile exhausts such as carbon monoxide, hydrocarbon or nitrogen monoxide.

A carrier according to an embodiment of the present invention includes not only γ-alumina as a main component but also magnesium oxide or barium oxide and silica. The use of silica and magnesium oxide or barium oxide enhance the heat resistance of γ-alumina. Therefore, a phase change from γ-alumina into α-alumina is substantially avoided and thus a carrier according to the present invention retains a high specific surface area.

For such purpose, it is desirable, but not required, that the carrier preferably include from 2 to 15% by weight of MgO or from 2 to 15% by weight of BaO, from 2 to 10% by weight of $SiO_2$ and from 75 to 96% by weight of γ-alumina, each weight % being based upon the total weight of the composite carrier. If the content of MgO or BaO, or of $SiO_2$ is substantially less than the range specified above, the effect of enhancing heat resistance may be less dramatic. On the other hand, a carrier containing more than the range specified above of MgO or BaO, or of $SiO_2$ may exhibit a somewhat smaller specific surface area, but will also possess good heat resistance.

Cerium dioxide (CeO$_2$) or other conventional compounds known to those of skill in the art can be used as the oxygen absorbing material. The content of the oxygen absorbing material is preferred to be from 5 to 30% by weight based on the weight of the carrier.

The active noble metal is preferably at least one metal selected from the group consisting of rhodium, platinum and palladium, and the content thereof is preferred to be from 0.1 to 5% by weight based on the weight of the carrier.

The characteristics of the present invention will become more apparent by the following examples and comparative examples. However, the present invention is not limited thereto.

EXAMPLE 1

Boehmite as an alumina source, Silica sol (20 wt % of silica included) as a silica source and magnesium carbonate as a magnesium oxide source were put into a beaker, water was added thereto, and then stirred and dried. The prepared product was calcined at 600° C. to obtain a composite oxide whose final composition is shown in Table 1. The specific surface area thereof was measured. The composite oxide was heated at 1000° C. for five hours and its specific surface area was measured again. The results are also shown in the following Table 1.

EXAMPLES 2–4

Three kinds of composite oxides having respective final compositions as shown in Table 1 were obtained in the same way as Example 1, except that the different compositions for starting material is used. The specific surface areas of the composite oxides were measured.

Thereafter, the composite oxides were heated at 1000° C. for five hours and the specific surface areas thereof were measured again. The results are shown in the following Table 1.

EXAMPLES 5–6

Two kinds of composite oxides having respective final compositions as shown in Table 1 were obtained in the same way as Example 1, except that barium carbonate was used instead of magnesium carbonate. The specific surface areas of the composite oxides were measured. Thereafter, the composite oxides were heated at 1000° C. for five hours and the specific surface areas thereof were measured again. The results are shown in the following Table 1.

Comparative example 1

For comparison, boehmite is calcined at 600° C. for five hours to obtain γ-alumina and then its specific surface area is measured. Then, the γ-alumina was heated at 1000° C. for five hours and its specific surface area was measured again. The results are shown in the following Table 1.

Comparisons 2–6

For comparison, five kinds of composite oxides were obtained in the same way as example 1, except that their respective compositions are as shown in Table 1 and the specific surface areas of the obtained oxides were measured. Then, the respective composite oxides were heated at 1000° C. for five hours and the specific surface areas thereof were measured again. The results are shown in the following Table 1.

TABLE 1

| | | Composition Ratio of Complex Metal Oxide (wt %) | | | | Specific Area after calcining 600° C. (m²/g) | Specific Area after heat treatment at 1000° C. (m²/g) | Reduction of Specific Area (%) |
|---|---|---|---|---|---|---|---|---|
| | | MgO | BaO | SiO$_2$ | γ-Al$_2$O$_3$ | | | |
| Examples | 1 | 15 | — | 5 | 80 | 185 | 115.6 | 37.5 |
| | 2 | 10 | — | 10 | 80 | 217.6 | 112.9 | 48.1 |
| | 3 | 5 | — | 5 | 90 | 215.4 | 121.7 | 43.51 |
| | 4 | 2 | — | 2 | 96 | 204.3 | 113.7 | 443 |
| | 5 | — | 10 | 10 | 80 | 210 | 115.3 | 45 |
| | 6 | — | 50 | 5 | 90 | 201.5 | 125.2 | 37.9 |
| Comparatives | 1 | — | — | — | 100 | 188 | 90 | 52 |
| | 2 | 20 | — | 15 | 65 | 226 | 105 | 54 |
| | 3 | 20 | — | 20 | 60 | 213 | 78 | 63 |
| | 4 | — | 20 | 15 | 65 | 106 | 29 | 73 |
| | 5 | — | 20 | 20 | 60 | 121 | 30 | 75 |
| | 6 | — | 25 | 25 | 50 | 126 | 40 | 70 |

As shown in the Table 1, the reduction of specific surface area according to heat treatment at 1000° C. is lower, that is, less than 50%, when the composition of a composite oxide is maintained within the preferable range of the present invention (Examples 1–6). To the contrary, a composite oxide whose composition is outside the preferable range of the present invention and γ-alumina does not function quite as well as a carrier, since the specific surface area decreases when heated at 1000° C.

EXAMPLE 7

Pt(NO$_3$)$_2$(NH$_3$)$_2$ was dissolved in water to obtain a solution. A carrier manufactured according to example 6 (BaO-SiO$_2$-Al$_2$O$_3$) was added to the obtained solution, and then dried to form a carrier impregnated a platinum (1.5% by weight included). Thereafter, the platinum-impregnated carrier and other components were mixed and ballmilled to form slurry 1 as follows:

| Slurry 1 | |
|---|---|
| Pt/BaO—SiO$_2$—Al$_2$O$_3$ | 70 g |
| alumina sol (20 wt % of Al$_2$O$_3$ included) | 180 g |
| water | 160 g |

A carrier impregnated with rhodium (0.5% by weight included) was prepared in the same way as slurry 1 except that Rh(NO$_3$)$_2$ was used instead of Pt(NO$_3$)$_2$(NH$_3$)$_2$. Thereafter, the rhodium-impregnated carrier and other components were mixed and ballmilled to form slurry 2 as follows:

| Slurry 2 | |
|---|---|
| Rh/BaO—SiO$_2$—Al$_2$O$_3$ | 70 g |
| alumina sol (20 wt % of Al$_2$O$_3$ included) | 180 g |
| water | 160 g |

The slurry 1 was washcoated on a honeycomb structure (400 cell/in²), blown and then dried at 200° C. in the air for two hours. Slurry 2 was washcoated on the slurry 1-impregnated honeycomb structure, blown and dried under the same condition. At this time, the quantity of slurry 1 and slurry 2 for washcoating were 25±5 wt % and 15±5 wt based on the weight of the honeycomb structure, respectively.

Finally, the honeycomb structure was subjected to thermal treatment at 400° C. in the air for two hours to form a catalyst according to an embodiment of the present invention.

The catalyst fabricated according to Example 7 was put into a fixed-bed flow reactor, a reactant gas including $C_3H_6$ 500 ppm, NO 1000 ppm, CO 1.0%, $CO_2$ 14%, $H_2O$ 1% and $O_2$ 0.5% was passed through reactor, and then the conversion rate for carbon monoxide, propylene and nitrogen monoxide were measured. The results are shown by curve a in FIGS. 1A through 1C, respectively. At this time, the reaction condition were controlled such that the space velocity was 40,000 $h^{-1}$ and the temperature was raised gradually from 200° C. to 500° C.

EXAMPLE 8

A catalyst fabricated in example 7 was subjected to a thermal treatment at 750° C. for six hours, and then the conversion rate for carbon monoxide, propylene and nitrogen monoxide were measured in the same manner as example 7. The results are shown by curve c in FIGS. 1A through iC.

Comparative example 7

A catalyst was obtained in the same way as example 7, except $Al_2O_3$ was used instead of $BaO-SiO_2-Al_2O_3$. The conversion rate for carbon monoxide, propylene and nitrogen monoxide were measured. The results are shown by curve b in FIGS. 1A through 1C.

Figure 1B:
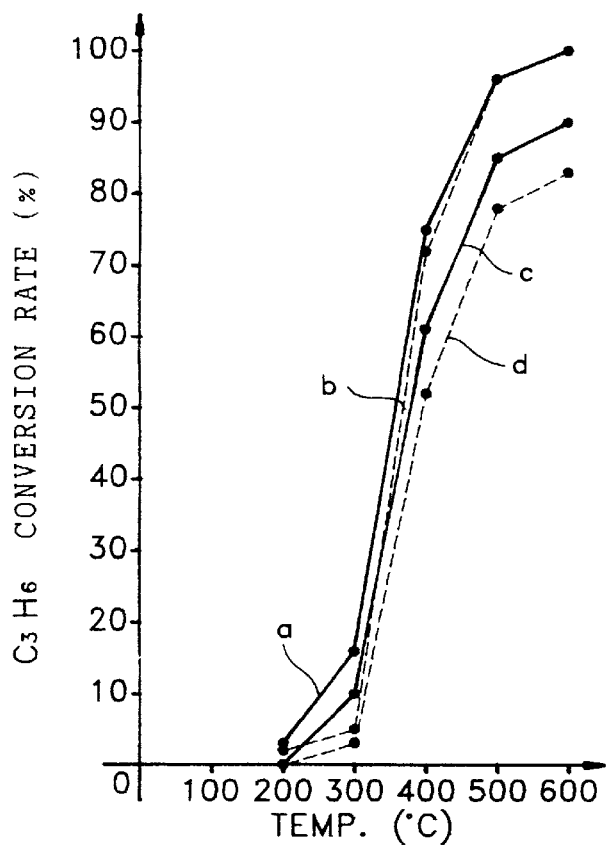
Figure 1C:
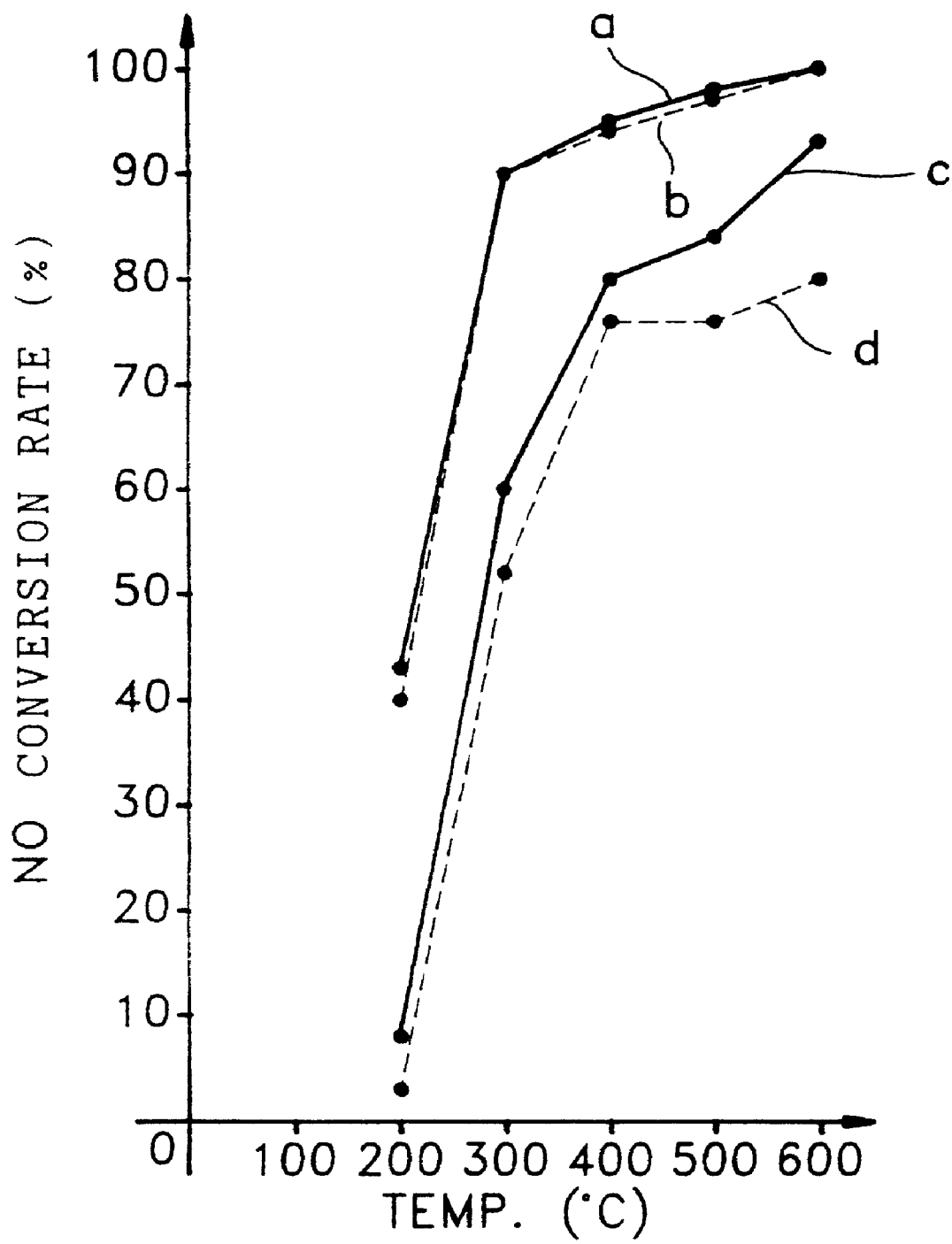

Comparing the result of example 7 with that of comparative example 7 with reference to FIGS. 1A through 1C, the catalyst according to the present invention has higher purification efficiency for carbon monoxide, propylene and nitrogen monoxide.

Comparison 8

The catalyst fabricated in comparative example 7 was subjected to a thermal treatment at 750° C. for six hours, and then the conversion rate for carbon monoxide, propylene and nitrogen monoxide were measured in the same manner as example 7. The results are shown in by curve d in FIGS. 1A through 1C.

Comparing the result of example 8 with that of comparative example 8 with reference to FIGS. 1A through 1C, the catalyst according to the present invention has higher purification efficiency for carbon monoxide, propylene and nitrogen monoxide than that of a conventional catalyst at high temperature.

As shown in above, by employing a carrier in a carrier according to the present invention, there is a reduced likelihood of γ-alumina undergoing a phase change to α-alumina. Catalysts according to the present invention are also less likely to experience a reduction in the ratio of specific surface area at high temperatures. Therefore, a catalyst according to the present invention is effective for purifying exhausts produced by motor vehicles, and in particular, automobiles, such as carbon monoxide, hydrocarbon or nitrogen monoxide. It should be noted that the catalyst of the present invention is also effective to purify other nitrogen oxides ($No_x$).

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A catalyst comprising:

(a) a carrier containing a composite of from 2 to 10% by weight $SiO_2$, from 75 to 96% by weight of γ-alumina, and from 2 to 15% by weight an alkali earth metal oxide selected from the group consisting of MgO and BaO, said weight percentages being based on the total weight of the composite;

(b) an oxygen absorbing material; and (c) at least one noble metal.

2. The catalyst as claimed in claim 1, wherein the oxygen absorbing material is present in an amount of from 5 to 30% by weight based on the weight of the carrier, and said noble metal is present in an amount of from 0.1 to 5% by weight based on the weigt of the carrier.

3. The catalyst as claimed in claim 1, wherein the noble metal is at least one metal selected from the group consisting of rhodium, palladium and platinum and the oxygen absorbing material is $CeO_2$.

4. The catalyst as claimed in claim 1, wherein the alkali earth metal oxide comprises MgO.

5. The catalyst as claimed in claim 1, wherein the catalyst comprises 5 to 10% by weight silica and 10 to 15% by weight alkali earth metal oxide, the alkali earth metal oxide being selected from the group consisting of BaO and MgO.

6. The catalyst as claimed in claim 1, wherein the composite is prepared by the process of:

(a) mixing from 2 to 10% by weight $SiO_2$, from 75 to 96% by weight of γ-alumina and from 2 to 15% by weight an alkali earth metal oxide selected from the group consisting of MgO and BaO, wherein the weight percentages are based on the weight of the carrier;

(b) calcining the mixture of (a) to form a calcined mixture; and (c) heating the calcined mixture.

7. The catalyst as claimed in claim 6, wherein the mixture is calcined at 600° C.

8. The catalyst as claimed in claim 6, wherein the calcined mixture is heated at 1000° C. for five hours.

9. The catalyst as claimed in claim 6, wherein the calcined mixture has a specific area within the range of from 185 to 218 $m^2/g$.

10. The catalyst as claimed in claim 9, wherein the composite has a specific area after heating within the range of from 113 to 126 $m^2/g$.

11. The catalyst as claimed in claim 10, wherein the reduction of specific area from the calcined mixture to the final composite after heating is within the range of from 37 to 49%.

12. A method of making a catalyst having a carrier containing a composite of from 2 to 10% by weight $SiO_2$, from 75 to 96% by weight of γ-alumina and from 2 to 15% by weight an alkali earth metal oxide selected from the group consisting of MgO and BaO, said weight percentages being based on the total weight of the composite:

an oxygen absorbing material: and at least one noble metal; comprising:

(a) preparing a carrier by forming a composite by carrying out the following steps:
  (i) mixing from 2 to 10% by weight $SiO_2$, from 75 to 96% by weight of γ-alumina and from 2 to 15% by weight an alkali earth metal oxide selected from the group consisting of MgO and BaO, wherein the weight percentages are based on the weight of the carrier;
  (ii) calcining the mixture of (i) to form a calcined mixture;
  (iii) heating the calcined mixture; and
(b) mixing the composite of step (a) with an oxygen absorbing material and at least one noble metal to form a catalyst slurry.

13. The method of claim 12, further comprising the steps of washcoating said catalyst slurry on a honeycomb structure, blowing and then drying the resultant structure, and then heating.

14. The method of claim 13, wherein said drying comprises drying the washcoated honeycomb structure at 200° C. for about two hours.

15. The method of claim 13, wherein said heating comprises heating at 750° C. for about six hours.

16. The method of claim 12, wherein the oxygen absorbing material is present in an amount from 5 to 30% by weight based on the weight of the carrier.

17. The method of claim 12, wherein the noble metal is at least one metal selected from the group consisting of rhodium, palladium and platinum.

18. The method of claim 12, wherein said noble metal is present in an amount of from 0.1 to 5% by weight based on the weight of the carrier.

19. The method of claim 12, wherein the oxygen absorbing material is $CeO_2$.

* * * * *